United States Patent [19]

Carter

[11] 4,278,244
[45] Jul. 14, 1981

[54] PIVOTABLE DOLLY FOR HOLDING TRANSPORTING AND HANGING A DOOR

[76] Inventor: Charles E. Carter, 921 Beach Rd., Hampton, Va. 23664

[21] Appl. No.: 87,436

[22] Filed: Oct. 22, 1979

[51] Int. Cl.³ .............................................. B25H 1/08
[52] U.S. Cl. ....................................... 269/17; 269/61; 269/152; 269/249; 269/904; 269/905
[58] Field of Search ................... 269/17, 249, 152, 60, 269/61, 58, 321 S, 321 F; 414/10–11; 280/47, 13

[56] References Cited

U.S. PATENT DOCUMENTS

| | | |
|---|---|---|
| 1,765,985 | 6/1930 | McHaffie . |
| 2,291,474 | 7/1942 | Kalmbach . |
| 2,558,404 | 6/1951 | Watson ................................. 269/17 |
| 2,574,825 | 11/1951 | Guild . |
| 2,959,309 | 11/1960 | Hopfeld . |
| 3,090,635 | 5/1963 | Masterson . |
| 3,151,897 | 10/1964 | Wagner ............................ 269/249 X |
| 3,580,601 | 5/1971 | Miles . |
| 3,717,357 | 2/1973 | Schaefer . |
| 3,828,955 | 8/1974 | Harkey . |
| 3,845,969 | 11/1974 | Nadeau . |
| 3,861,662 | 1/1975 | Morse ..................................... 269/17 |
| 4,050,671 | 9/1977 | Coleman ............................ 269/17 X |

Primary Examiner—Robert C. Watson
Attorney, Agent, or Firm—Finnegan, Henderson, Farabow, Garrett & Dunner

[57] ABSTRACT

A pivotable dolly for securely holding a heavy rectangular member, such as a door, by one edge to permit the transportation, preparation and final attachment of the member in its intented position. The dolly includes an elongated member, clamps fixed to the elongated member to releasably hold the rectangular member by its edge, handles for supporting the dolly when the elongated member is positioned horizontally, and a pair of wheels for permitting the rolling and pivoting of the dolly. When the dolly is pivoted to a horizontal position, the rectangular member being held can be vertically adjusted to properly align the rectangular member for attachment.

11 Claims, 7 Drawing Figures

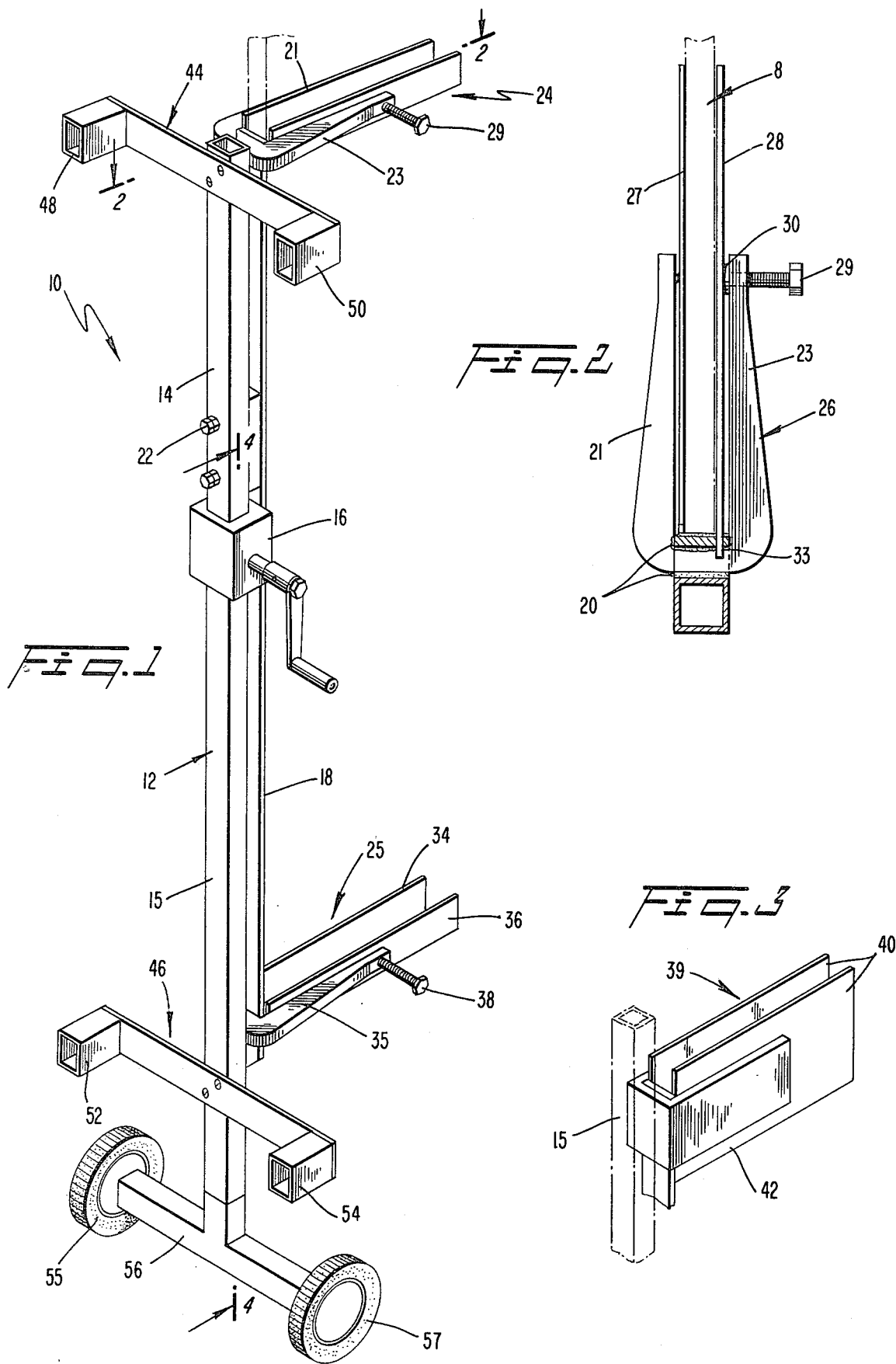

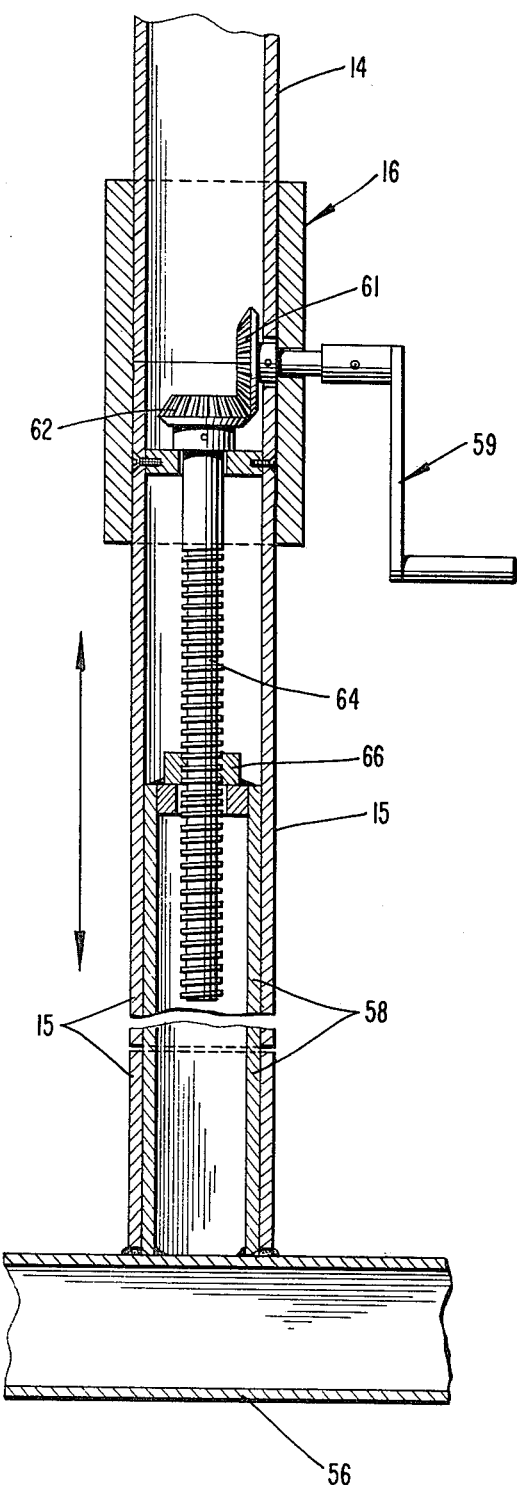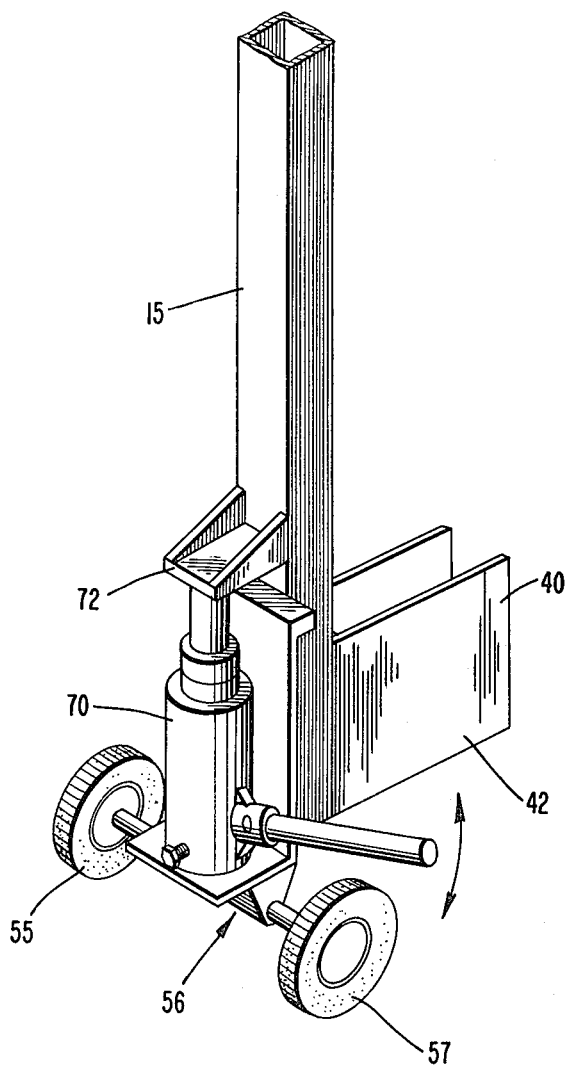

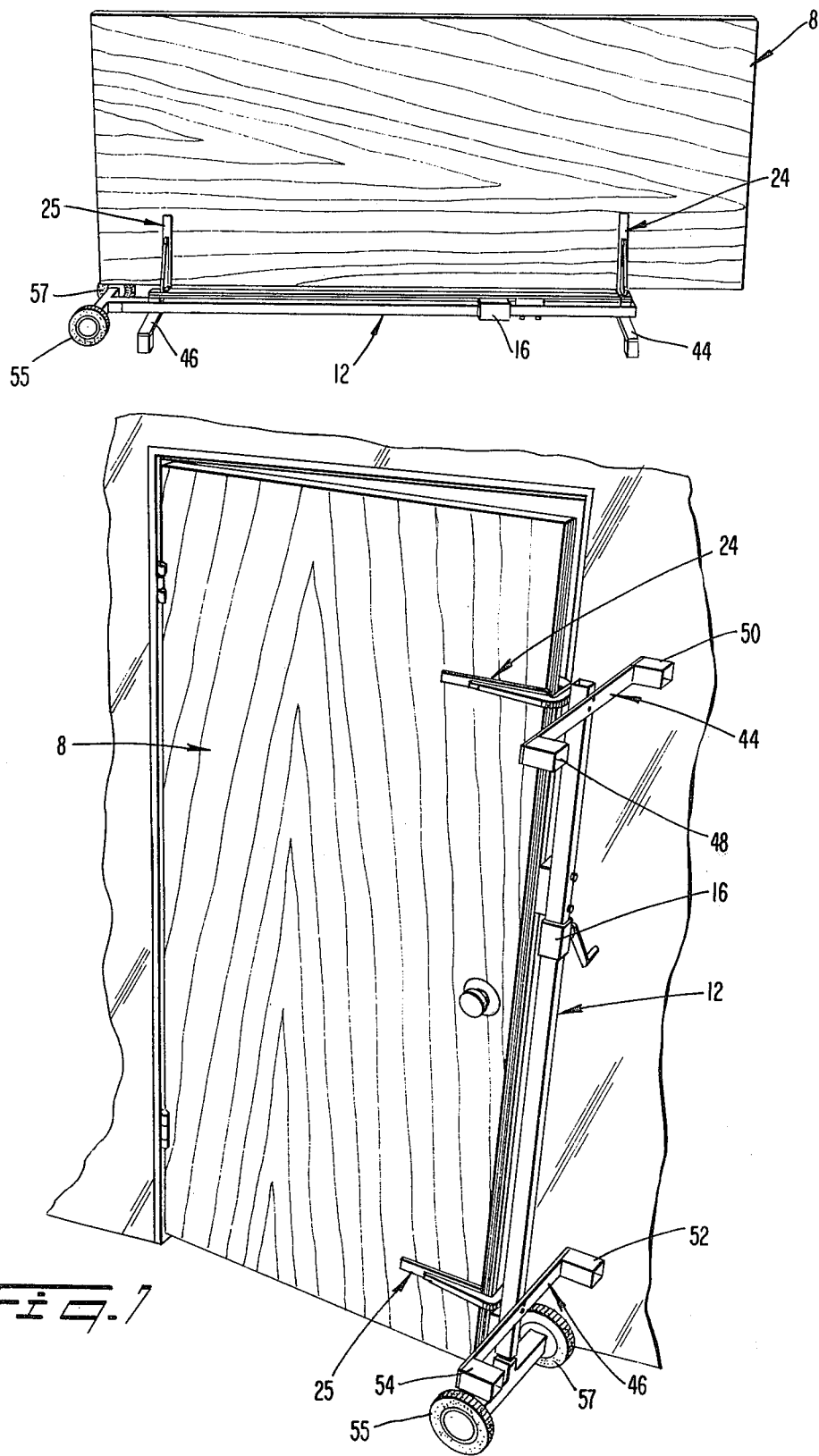

PIVOTABLE DOLLY FOR HOLDING TRANSPORTING AND HANGING A DOOR

BACKGROUND OF THE INVENTION

1. Field of the Invention

The present invention relates generally to a pivotable dolly for securely holding a heavy rectangular construction member during its preparation, transportation and attachment.

2. Description of the Prior Art

Several types of dollies have been developed in the past for use in the construction trade. Conventional dollies consist of an L-shaped support member with a pair of wheels at the apex of the L. While such dollies can transport heavy articles of construction from one area to another, these dollies do not securedly hold the articles of construction during such transit and, in particular, do not securedly hold the article when in either a horizontal or a vertical position.

During the construction of buildings it is often necessary to hold rectangular construction articles, such as windows, panels and doors, in both horizontal and vertical positions to permit workmen to prepare and finally attach the window, panel or door in its intended position. In normal circumstances, several workmen are required to move heavy rectangular construction articles during their preparation and attachment. Often the articles must be held at a selected vertical level while being attached in place. Due to the high cost of labor, the preparation and hanging of such articles is expensive.

There is, therefore, substantial need for a dolly which will permit a single workman not only to transport heavy rectangular members from place to place but also to hold them securely in position for preparation and attachment.

In particular, the hanging of heavy doors, such as fire doors, has conventionally required the attention of two or more workmen. The door must be transported to the place of preparation and then be securedly held in a horizontal position to permit the planing and chiseling of the door and the attachment of the hinge plates. Next, the door must be transported to the door jamb and lifted into position. Finally, the door must be hung by placing the hinge bolts through the hinge plates attached to the door and the jamb. Conventional dollies do not permit a single workman to perform these operations.

SUMMARY OF THE INVENTION

The object of the present invention is to provide a pivotable dolly for securedly holding a heavy rectangular member by one edge to permit the transportation, preparation and final attachment of the member. Another object is to provide a pivotable dolly which can hold the lower surface of the rectangular member at a selected level when the dolly is in a vertical position. Yet another object is to provide a vertically adjustable dolly which permits the selective vertical placement of the rectangular member or door being held. Another object is to provide a dolly which permits a single workman to prepare, transport, align and hang a door.

Additional objects and advantages of the invention will be set forth in part in the description which follows, and in part will be obvious from the description, or may be learned by practice of the invention. The objects and advantages may be realized and attained by means of the instrumentalities and combinations particularly pointed out in the appended claims.

To achieve the objects and in accordance with the purpose of the invention, as embodied and broadly described herein, the invention comprises a pivotable dolly for securely holding a heavy rectangular member by one edge comprising an elongated member, means fixed to the elongated member for releasably holding the rectangular member with the held edge of the rectangular member substantially parallel to the elongated member, means for steadily supporting the elongated member and the rectangular member when the elongated member is in the horizontal position, and roller means attached to one end of the elongated member for permitting the rolling of the dolly and the pivoting of the elongated member between horizontal and vertical positions, the elongated member holding the lower surface of the rectangular member at a selected level when the elongated member is in a vertical position.

In the preferred embodiment, the dolly includes a top and a bottom bracket which clampingly engage the rectangular member and further includes top and bottom handles which support the dolly when in a horizontal position. The roller means comprises a pair of wheels rotatable about an axle interconnected to the channel member, and the wheels and the axle are slideable relative to the elongated member in a direction parallel to the member. A crank and gear mechanism can effect the relative sliding of the elongated member and the wheels on their axis.

The pivotable dolly of the present invention overcomes the problems and disadvantages of the prior dollies since the brackets clampingly engage the rectangular member, thereby preventing the member from sliding or falling when the dolly is pivoted from a horizontal to a vertical position. Furthermore, the handles of the dolly provide a support surface which securedly supports the dolly and the held rectangular member when both are in a horizontal position. The member can be prepared while supported in this secure position. Finally, the roller means and the holding means of the dolly can be designed or positioned so that the rectangular member is held at a selected level when the dolly is in the vertical position. While held in this selected level, the door can be permanently attached in its intended position.

The preferred embodiment of the present invention is particularly suited to the transportation, preparation and hanging of heavy doors, such as fire doors. With the dolly, a single workman can transport the door to an area of preparation and then place the dolly and door in the horizontal position. While the door is securedly held in this position by the top and bottom handles, the workman can plane the door and attach the hinge plates. The workman can then roll the door to a doorjamb, raise the door to a substantially vertical position, vertically adjust the dolly until the door's hinge plates are aligned with the hinge plates of the doorjamb and place the hinge bolts through the aligned hinge plates.

It is understood that both the foregoing general description and the following detailed description are exemplary and explanatory only and are not restrictive of the invention, as claimed.

The accompanying drawings, which are incorporated in and constitute a part of this Specification, illustrate one embodiment of the invention and, together with the description, serve to explain the principles of the invention.

BRIEF DESCRIPTION OF THE DRAWINGS

FIG. 1 is a perspective view of the dolly embodying the invention.

FIG. 2 is a cross-sectional view of a portion of the invention taken along the line 2—2 of FIG. 1 and showing the preferred embodiment of the brackets of the invention.

FIG. 3 is a perspective view of a second embodiment of the bottom bracket of the invention.

FIG. 4 is a cross-sectional view of the invention taken along lines 4—4 of FIG. 1 and showing the preferred means for providing the vertical adjustment of the dolly.

FIG. 5 is a perspective view showing a second means for providing the vertical adjustment of the dolly.

FIG. 6 is a perspective view showing the dolly securedly holding a door in a horizontal position to permit the preparation of the door for hanging.

FIG. 7 is a perspective view showing the dolly holding a door in a vertical position to permit the hanging of the door in a door jamb.

Reference will now be made in detail to the present preferred embodiments of the invention, examples of which are illustrated in the accompanying drawings, like numerals being used for like parts.

The preferred embodiment of the invention is shown in FIG. 1 and is represented generally by the numeral 10. The pivotable dolly includes an elongated member, shown generally as 12, which includes a pair of rectangular members 14 and 15 fixed to gearbox 16 and a single elongated plate 18 fixed to rectangular members 14 and 16. The plate and rectangular members are fixed to one another by standard means, such as welds at 20 and/or bolts 22.

In accordance with the invention, the present invention includes a means fixed to said elongated member for releasably holding a rectangular member, shown generally as door 8, with the held edge of the rectangular member substantially parallel to the elongated member 12. As embodied herein, that means comprises a top bracket 24 and a bottom bracket 25.

Top bracket 24 is shown in more detail in FIG. 2 and includes a deep C-clamp 26 welded at 20 between the rectangular member 14 and flat plate 18. The C-clamp has two arms 21 and 23, and a clamp bolt 29 with a pivotable end member 30. A first elongated finger 27 is fixed to one arm 21 of the C-clamp 26 by a weld, and a second elongated finger 28 is welded to the pivotable end member 30 of bolt 29 of the C-clamp 26. The second elongated finger 28 includes a notch 33 which accepts a portion of the C-clamp 26, thereby preventing the rotation of finger 28 when the bolt 29 is tightened. The elongated fingers 27 and 28 when clamped against door 8 lay flat against the door and do not mar its surfaces.

As shown in FIG. 1, in the preferred embodiment of this invention, the bottom bracket 25 is substantially identical to the top bracket 24. That bottom bracket includes C-clamp 35, a first elongated finger 34, a second elongated finger 36 and tightening bolt 38.

In the preferred embodiment of the invention, an article can be securedly clamped at both the top and bottom by brackets 24 and 25, respectively. When an article is so held, it is practically impossible for the article to fall out of the dolly, regardless of the position of the dolly.

While the use of two clamping brackets is preferred, the inventor has found that the use of a single clamping bracket at the top of the held article is sufficient to securedly hold the article and prevent its tipping out of the dolly when the dolly is pivoted to the horizontal position. Therefore, a second embodiment of the bottom bracket is shown in FIG. 3 and is identified generally as bracket 39. That second embodiment 39 includes a pair of side flanges 40 and a bottom surface 42. The side flanges 40 contain an article to be held, and the bottom surface 42 receives and supports the bottom of the article.

As can be seen in FIG. 1, the flat plate 18 is welded to the inside faces of top bracket 24 and lower bracket 25, thereby providing a smooth surface against which the edge of a rectangular member can rest. When the member is held by the dolly, its held edge is substantially parallel to flat plate 18.

In accordance with the invention, the invention further includes a means for steadily supporting the elongated member 12 when the elongated member is in the horizontal position. As shown in FIG. 6 and as embodied herein, in the preferred embodiment that means comprises a first upper handle 44 and a second lower handle 46. The upper handle 44 is connected to rectangular member 14 by conventional means such as welds or bolts. Two outer portions 48 and 50 of handle 44 extend outwardly from the elongated member 12 opposite to the top and bottom brackets 24 and 25, respectively. A similar lower handle 46 is fixed to the bottom portion of the elongated channel member and includes portions 52 and 54 which extend outward from the channel opposite to the lower bracket 25 and beyond the reach of wheels 55 and 57.

The upper handle 44 permits a workman to securedly grasp the dolly when moving the dolly from place to place or when pivoting the dolly. The lower handle 46 provides a surface where a workman can place his foot when pivoting the dolly and the held member to the vertical position. Furthermore, as shown in FIG. 6, when the dolly is in the horizontal position, it rests upon the outer extremities or portions of the upper and lower handles 44 and 46, respectively.

While the preferred embodiment of the invention includes both upper and lower handles 44 and 46, respectively, the dolly can be steadily supported in the horizontal position without the lower handle. In a dolly having only one upper handle 44, the dolly is supported in the horizontal position by the outer extremities of the upper handle 44 and by the wheels 55 and 57 of the dolly.

In accordance with the invention, the invention further includes roller means attached to one end of the elongated member for permitting the rolling of the dolly and the pivoting of the elongated member between horizontal and vertical positions. As embodied herein, the roller means comprises a pair of wheels 55 and 57 rotatable about axle 56. The axle 56 and wheels 55 and 57 can be designed and positioned so that the dolly holds the lower surface of a held member at a selected level when the dolly is in the vertical position. Additionally, a workman can adjust the level at which a member is held, when vertical, by clamping the member at the desired position. It is therefore possible for the present invention to hold a member so that when the dolly is vertical, the member will be properly aligned and positioned for permanent attachment in its intended position.

In the preferred embodiment of the invention, the axis 56 and wheels 55 and 57 are moveable relative to the elongated member 12 in a direction parallel to member 12. As best shown in FIG. 4, axle 56 is fixedly attached to rectangular tube 58 which is slideably received by the lower rectangular member 15. The wheels 55 and 57 are therefore moveable relative to elongated member 12. The preferred embodiment of the invention further includes means for effecting the sliding of the axle 56 and wheels 55 and 57 relative to the elongated member 12 to vertically adjust an article being held.

As best shown in FIG. 4, the preferred embodiment of the invention includes a gearbox 16 including a lift handle 59, a vertical spider gear 61 fixed to said lift handle 59 and a horizontal spider gear 62. Horizontal spider gear 62 is fixed to an elongated bolt 64 which is threadly engaged by a nut 66 welded to tube 58. In operation the turning of handle 59 moves the wheels 55 and 57 up or down relative to the elongated member, as desired. In the preferred embodiment, the bolt 64 is approximately eighteen inches long and therefore permits relative sliding of approximately eighteen inches.

A second means of inducing the moving of the wheels 55 and 57 relative to the elongated member 12 is shown in FIG. 5. In that embodiment a hydraulic jack 70 is fixed at one end to the axle 56 and at the other end to a bracket 72 fixedly attached to the elongated member 12. By operation of the jack, the elongated member 12 can be slid up and down relative to the wheels 54.

The above described dolly may be made from conventional metallic and plastic materials. The inventor has found that construction from aluminum has been economic and successful.

The above described dolly can be used to transport, prepare and position a wide variety of heavy rectangular members used in the construction trade. The dolly is particularly suited for use with windows, wall panels and doors.

With the present invention, a single workman can transport, prepare and hang a heavy door. In operation, a workman places the door within brackets 24 and 25 and clamps the door securely into place. The workman can then roll the dolly and door to a preparation area where the dolly and door can be placed in a horizontal position, as shown in FIG. 6. While in the horizontal position, the door can be planed, fitted and hinged. The workman can then roll the dolly and door to the doorjamb where it is to be fitted. By pivoting the dolly, the workman can place the door into a vertical position and align the bottom hinge plates of the door and door jamb by either pivoting the dolly or cranking the lift handle. After placing a pin through the bottom hinge plates, the workman can align and pin the top hinge plates by pivoting or cranking the dolly. The door can then be released from the dolly and the operation completed.

Other embodiments of the invention will be apparent to the skilled in the art from consideration of the Specification and practice of the invention disclosed herein, it is intended that the Specification and examples be considered as examplary only, with a true scope and spirit of the invention being indicated by the following claims.

What is claimed is:

1. A pivotable dolly for securely holding a heavy rectangular member by one edge comprising:
   an elongated member;
   means fixed to said elongated member for releasably holding the rectangular member with the held edge of the rectangular member substantially parallel to said elongated member;
   roller means attached to one end of said elongated member for permitting the rolling of the dolly and the pivoting of the elongated member between horizontal and vertical positions, said elongated member holding the lower surface of the rectangular member at a selected level when said elongated member is in a vertical position; and
   means for steadily supporting said elongated member when said elongated member is in the horizontal position, said means including a first handle secured to said elongated member, said first handle including portions projecting outwardly from said elongated member opposite to said holding means and a second handle secured to said elongated member proximate to said rolling means, said second handle including portions projecting outwardly from said elongated member opposite to said holding means and beyond said roller means.

2. The dolly of claim 1 wherein said holding means comprises a bottom bracket secured to said elongated member proximate to said roller means and a top bracket secured to said elongated member above said bottom bracket, said top bracket including a clamping means for releasably grasping the rectangular member.

3. The dolly of claim 2 wherein said clamping means of said top bracket includes a first elongated finger and a second elongated finger, said elongated fingers being selectively moveable relative to one another to permit the clamping and unclamping of the rectangular member.

4. The dolly of claim 2 wherein said clamping means includes a C-clamp having two arms, a clamp bolt and a pivotable end member at one end of the clamp bolt; a first elongated finger fixed to one arm of said C-clamp; and a second elongated finger fixed to the pivotable end member of said C-clamp, said second elongated finger including a notch which accepts a portion of said C-clamp and thereby prevents the rotation of said second member with respect to said C-clamp.

5. The dolly of claim 3 wherein said bottom bracket includes side flanges for containing the rectangular member and a bottom surface for receiving and supporting the bottom of the rectangular member.

6. The dolly of claim 3 wherein said bottom bracket includes a clamping means for releasably grasping the rectangular member.

7. The dolly of claim 1 wherein said roller means comprises a pair of wheels rotatable about an axle interconnected to said elongated member.

8. The dolly of claim 1 wherein said roller means is slideable relative to said elongated member in a direction parallel to said elongated member, and further comprising means for effecting the sliding of said roller means relative to said elongated member to vertically adjust the rectangular member.

9. The dolly of claim 1 wherein said effecting means includes a hydraulic jack.

10. The dolly of claim 8 wherein said effecting means includes a lift handle rotatably positioned on said elongated member, a pair of spider gears interconnected with said lift handle, an elongated bolt fixed to one of said spider gears, a threaded nut fixed to said roller, said elongated bolt being threadily engaged in said threaded nut.

11. A pivotable dolly for securely holding a door to permit the preparation, transportation and hanging of the door comprising:

an elongated member;

a top bracket fixed to said elongated member, said top bracket including clamping means for releasably holding the door with an edge of the door substantially parallel to said elongated member;

a bottom bracket fixed to said elongated member for engaging and steadying the door;

a handle fixed to said elongated member opposite to said top bracket for steadily supporting said elongated member and the door when in a horizontal position;

roller means, slidable relative to said elongated member and said brackets in a direction parallel to said elongated member, for permitting the rolling of the dolly and the pivoting of the elongated member between horizontal and vertical positions, said roller means including a support slidable within said elongated member; and means for effecting the sliding of said roller means relative to said elongated member to vertically adjust the door, said means including a lift handle rotatably positioned on said elongated member, a pair of spider gears interconnected with said lift handle, an elongated bolt fixed to one of said spider gears, and a threaded nut fixed to said support of said roller means, said elongated bolt being threadily engaged in said threaded nut.

* * * * *